US009242725B1

(12) United States Patent
Lord et al.

(10) Patent No.: US 9,242,725 B1
(45) Date of Patent: Jan. 26, 2016

(54) SELECTION OF EMERGENCY DESCENT RATES FOR AN AIRCRAFT DUE TO CABIN DEPRESSURIZATION

(71) Applicant: THE BOEING COMPANY, Chicago, IL (US)

(72) Inventors: Mark J. Lord, Redmond, WA (US); Steven M. Loukusa, Bothell, WA (US)

(73) Assignee: The Boeing Company, Chicago, IL (US)

( * ) Notice: Subject to any disclaimer, the term of this patent is extended or adjusted under 35 U.S.C. 154(b) by 106 days.

(21) Appl. No.: 13/893,164

(22) Filed: May 13, 2013

(51) Int. Cl.
G05D 1/00 (2006.01)
B64C 19/00 (2006.01)

(52) U.S. Cl.
CPC .................. B64C 19/00 (2013.01)

(58) Field of Classification Search
CPC ........ G01C 23/00; G01C 5/005; G08G 5/025; G08G 5/04; G08G 5/0021; G08G 5/0039; G08G 1/096827; G05D 1/101; G05D 1/046; G05D 1/0816; G05D 1/0055; G05D 1/0623; G05D 1/0825; G05D 1/085; G05D 1/0061; B64C 19/00
USPC .......................................................... 701/8
See application file for complete search history.

(56) References Cited

U.S. PATENT DOCUMENTS

| 5,357,949 | A  | * | 10/1994 | Bertheau et al. | 128/204.29 |
| 6,507,776 | B1 | * | 1/2003  | Fox, III        | 701/11 |
| 7,786,900 | B2 | * | 8/2010  | Bitar           | G01C 23/00 340/645 |
| 2004/0107027 | A1 | * | 6/2004 | Boudrieau | 701/1 |
| 2004/0206352 | A1 | * | 10/2004 | Conroy, Jr. | 128/204.23 |
| 2004/0206353 | A1 | * | 10/2004 | Conroy, Jr. | 128/204.23 |
| 2005/0005939 | A1 | * | 1/2005  | Talty | 128/205.24 |
| 2006/0041345 | A1 | * | 2/2006  | Metcalf | 701/33 |
| 2007/0043482 | A1 | * | 2/2007  | Aimar | 701/4 |
| 2009/0228161 | A1 | * | 9/2009  | Botargues et al. | 701/11 |
| 2011/0224849 | A1 | * | 9/2011  | Braly et al. | 701/9 |

OTHER PUBLICATIONS

Emergency Descent—Tech Ops Forum, Ailiners.net, 5 pages posted Mar. 6, 2004, available online @ http://www.airliners.net/aviation-forums/tech_ops/read.main/82291/ last accessed Sep. 2, 2015.*

* cited by examiner

*Primary Examiner* — Behrang Badii
*Assistant Examiner* — Daniel L Greene
(74) *Attorney, Agent, or Firm* — Duft Bornsen & Fettig LLP

(57) ABSTRACT

Systems and methods are disclosed for selecting an emergency descent rate for an aircraft based on the rate of depressurization in the cabin of the aircraft. In one embodiment, the method includes the steps of detecting a depressurization warning for the cabin of the aircraft, and determining a rate of depressurization inside the cabin. The method further includes selecting a rate for an emergency descent for the aircraft in response to the depressurization warning based on the rate of depressurization inside the cabin, and initiating the emergency descent at the selected rate.

5 Claims, 4 Drawing Sheets

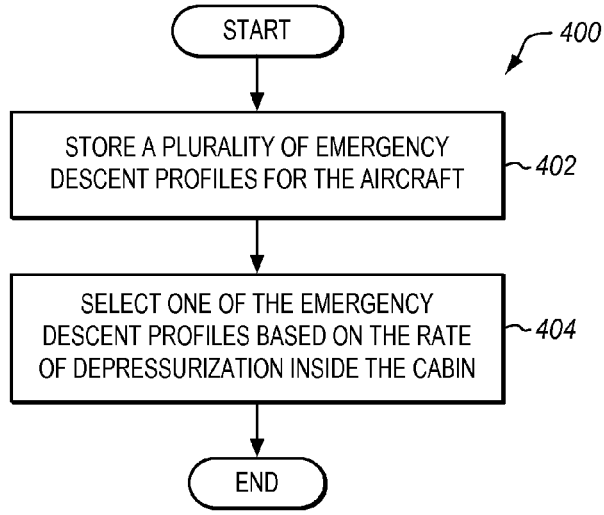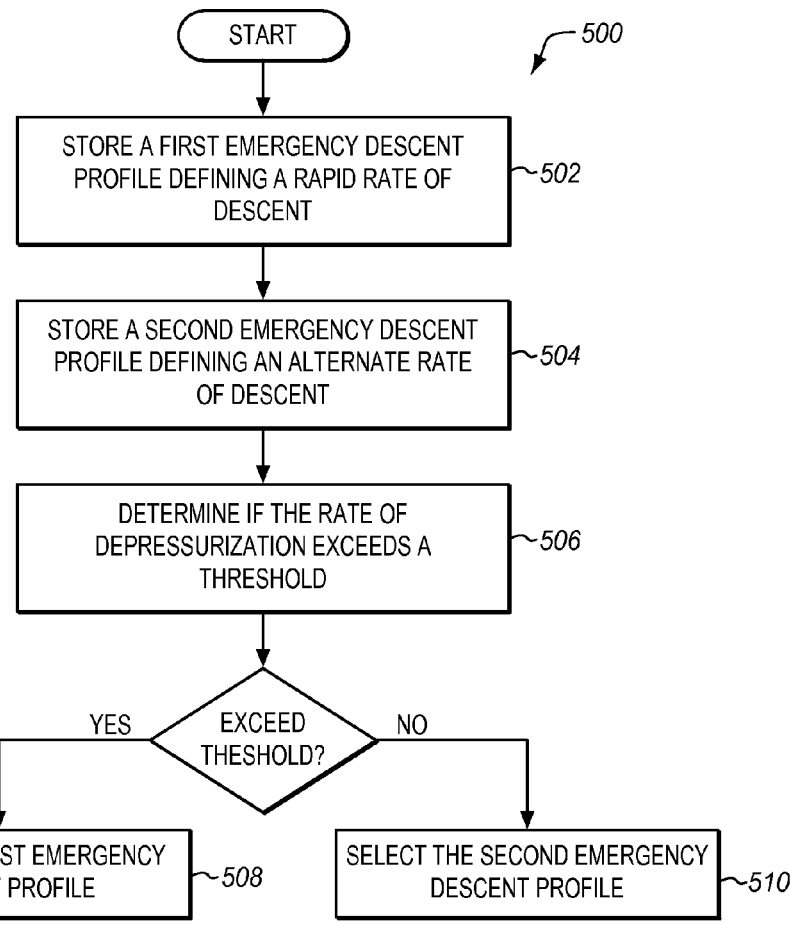

SELECTION OF EMERGENCY DESCENT RATES FOR AN AIRCRAFT DUE TO CABIN DEPRESSURIZATION

FIELD

This disclosure relates to the field of aircraft, and more particularly, to an emergency descent of an aircraft in response to cabin depressurization.

BACKGROUND

Some passenger aircraft are pressurized to enable the aircraft to fly at high altitudes. Pressurization of the cabin protects the crew and passengers on the aircraft from suffering from conditions caused by lack of oxygen. A typical aircraft includes a cabin pressure system that monitors the cabin pressure to make sure it is maintained at a safe level. If the cabin were to become depressurized while the aircraft was at a cruising altitude, then the cabin pressure system or a warning system will trigger a warning to the flight crew. The flight crew will initiate emergency descent procedures so that the aircraft descends down to 10,000 feet or a minimum safe altitude. According to traditional procedures, the emergency descent is designed to get the aircraft to a safe altitude as soon as possible. In some cases, it may be necessary to perform a more rapid emergency descent to protect the crew and passengers to minimize exposure to elevated cabin altitudes. However, an emergency descent that is more rapid can be uncomfortable and stressful to the passengers on board due to the inherent changes in airplane attitude, accelerations, and buffeting that can occur when performing a rapid emergency descent maneuver.

SUMMARY

Embodiments described herein provide emergency descent procedures where the rate for the emergency descent is based on the rate of depressurization in the cabin of the aircraft. Many times when a cabin pressure warning is triggered, the rate of depressurization inside the cabin is slow. When the depressurization is slow, there may not be a need to initiate an emergency descent as rapidly as possible to a safe altitude. Therefore, the embodiments described herein select a rate for an emergency descent based on the rate of depressurization inside the cabin. If the rate of depressurization is high, then the rate for the emergency descent may be more rapid. If the rate of depressurization is low, then the rate for the emergency descent may be slower. Consequently, the rate for the emergency descent may be proportional to the rate at which the cabin is depressurizing.

One embodiment comprises a method of implementing an emergency descent. The method includes detecting a depressurization warning for a cabin of an aircraft, and determining a rate of depressurization inside the cabin. The method further includes selecting a rate for an emergency descent for the aircraft in response to the depressurization warning based on the rate of depressurization inside the cabin, and initiating the emergency descent at the selected rate.

Another embodiment comprises an emergency descent system of an aircraft. The emergency descent system includes a warning system configured to detect a depressurization warning for a cabin of the aircraft, and to determine a rate of depressurization inside the cabin. The emergency descent system further includes a descent control system configured to select a rate for an emergency descent for the aircraft in response to the depressurization warning based on the rate of depressurization inside the cabin, and to initiate the emergency descent at the selected rate.

Another embodiment comprises a non-transitory computer readable medium that stores program instructions for an emergency descent system for an aircraft. The program instructions when executed by a computer system, instruct the computer system to detect a depressurization warning for a cabin of the aircraft, and to determine a rate of depressurization inside the cabin. The program instructions further instruct the computer system to select a rate for an emergency descent for the aircraft in response to the depressurization warning based on the rate of depressurization inside the cabin, and to initiate the emergency descent at the selected rate.

The features, functions, and advantages that have been discussed can be achieved independently in various embodiments or may be combined in yet other embodiments further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

FIG. 4 is a flow chart illustrating a method of selecting a rate for an emergency descent in an exemplary embodiment.

FIG. 5 is a flow chart illustrating a method of selecting a rate for an emergency descent in an exemplary embodiment.

DESCRIPTION

The figures and the following description illustrate specific exemplary embodiments. It will thus be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
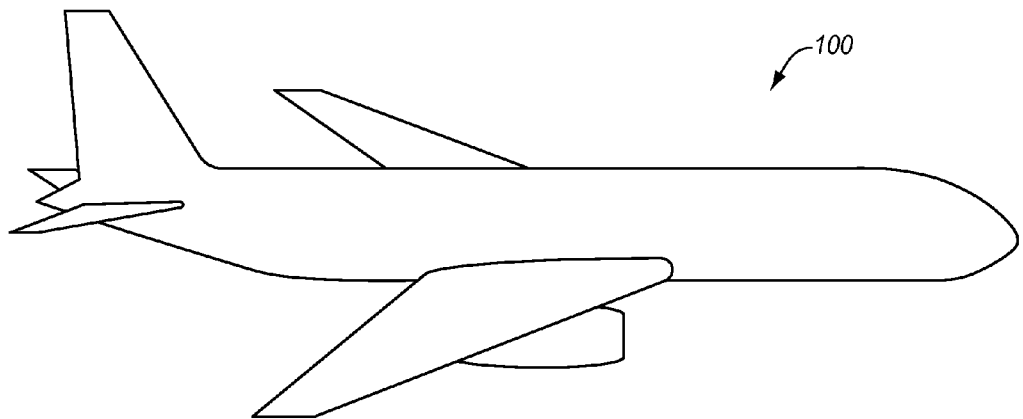
FIG. 1 is a view of an aircraft.

FIG. 1 is a view of an aircraft 100. The cabin of aircraft 100 is pressurized to create a safe environment in the cabin and supply pressurized air. The pressure inside the cabin of aircraft 100 is equivalent to an altitude, so the cabin pressure is referred to as a "cabin altitude". For example, if the pressure of the cabin is about 11 lbs/in$^2$, then the cabin altitude is about 7,000 feet. This pressure is equivalent to what a human would experience if he/she were at an elevation of 7,000 feet. The maximum cabin altitude allowed by transport category aircraft regulations is 8,000 feet. Thus, the pressure inside the cabin of aircraft 100 is kept below that altitude during normal operation.

A conventional aircraft includes a system that monitors the cabin altitude during flight. If the cabin altitude reaches 10,000 feet, then the system triggers a warning and the flight crew initiates emergency descent procedures. The emergency descent procedures for conventional aircraft have a single emergency descent profile that defines the descent rate for the aircraft when a depressurization warning is triggered. On some aircraft, the descent rate in the single emergency descent profile is rapid or aggressive to take the aircraft from a cruising altitude to 10,000 feet or a minimum safe altitude. However, a rapid emergency descent to the safe altitude may be unnecessarily uncomfortable and stressful to the occupants of the aircraft.

The embodiments described herein provide enhanced systems and methods for handling emergency descents. Instead of having an emergency descent design that defines a single maximum rate for an emergency descent, the following embodiments select the rate for an emergency descent based on the rate of depressurization inside the cabin. Therefore, if the depressurization rate inside the cabin is rapid, then the rate for the emergency descent can likewise be rapid. If the depressurization rate inside the cabin is slower, then the rate for the emergency descent can likewise be slower. Thus, the rate for the emergency descent can be proportional to the rate at which the cabin is losing pressure, instead of being the same descent rate for all scenarios.

Figure 2:
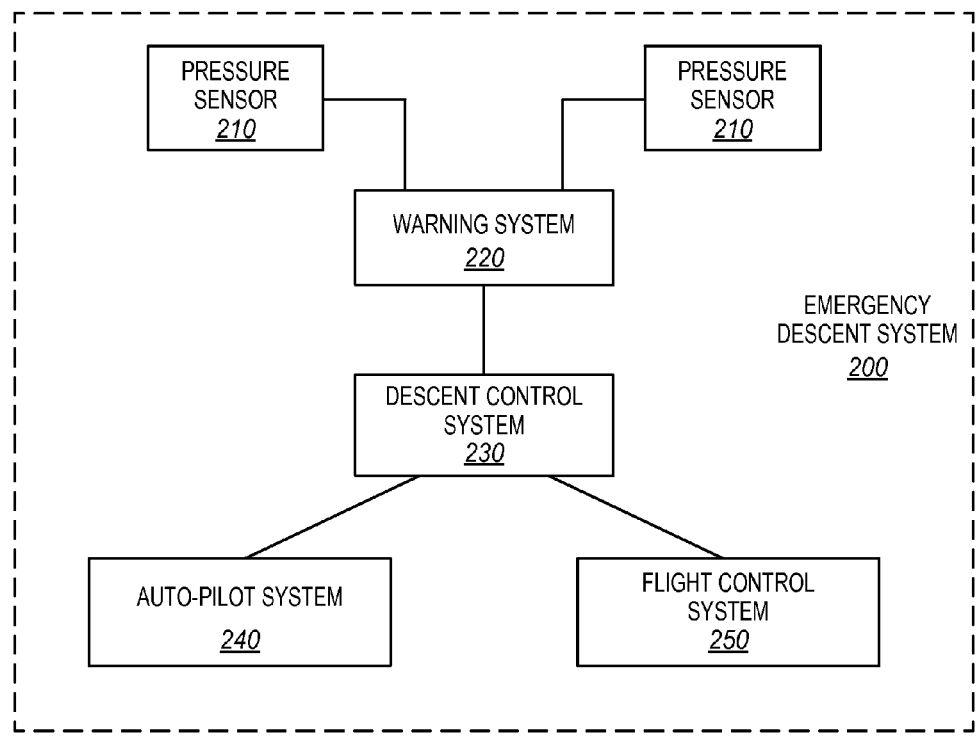
FIG. 2 is a schematic diagram of an emergency descent system of an aircraft in an exemplary embodiment.

FIG. 2 is a schematic diagram of an emergency descent system 200 of aircraft 100 in an exemplary embodiment. Emergency descent system 200 includes a plurality of pressure sensors 210 and a warning system 220. Pressure sensors 210 comprise any type of sensor that is able to measure the pressure inside of the cabin of aircraft 100. Warning system 220 comprises any system that is able to monitor readings from pressure sensors 210, and monitor the pressure inside of the cabin of aircraft 100. Emergency descent system 200 also includes a descent control system 230. Descent control system 230 comprises any system that controls how aircraft 100 descends to a safe altitude in response to a depressurization warning. In this embodiment, descent control system 230 is in communication with an autopilot system 240 and a flight control system 250. Therefore, descent control system 230 can provide input to autopilot system 240 and/or flight control system 250 to initiate an emergency descent.

When aircraft 100 is in flight, warning system 220 monitors the pressure, or cabin altitude, inside the cabin. Warning system 220 takes continual or periodic readings from pressure sensors 210, and stores the readings. In the event that the cabin begins to lose pressure, emergency descent system 200 may operate as described in FIG. 3.

Figure 3:
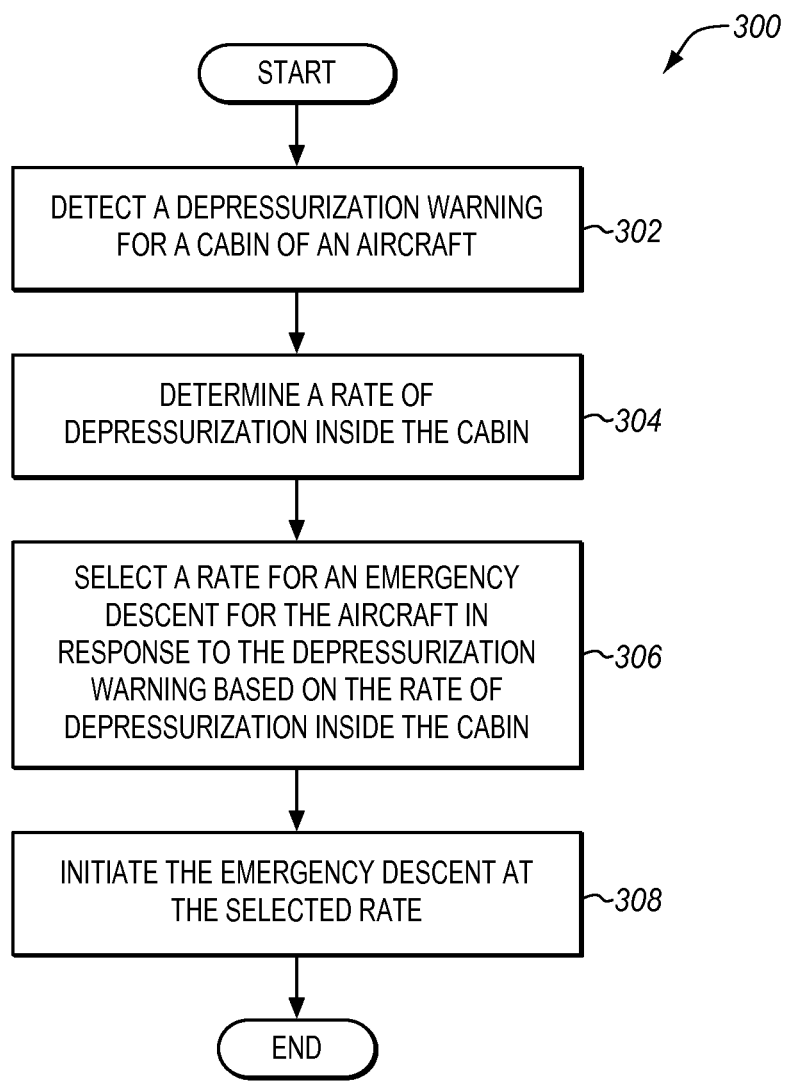
FIG. 3 is a flow chart illustrating a method of implementing an emergency descent in an exemplary embodiment.

FIG. 3 is a flow chart illustrating a method 300 of implementing an emergency descent in an exemplary embodiment. The steps of method 300 will be described with respect to emergency descent system 200 of FIG. 2, although one skilled in the art will understand that the methods described herein may be performed by other devices or systems not shown. The steps of the methods described herein are not all inclusive and may include other steps not shown. The steps for the flow charts shown herein may also be performed in an alternative order.

In step 302, warning system 220 detects a depressurization warning for the cabin of aircraft 100. Warning system 220 interfaces with pressure sensors 210 to monitor the pressure inside of the cabin. For example, if the cabin altitude reaches 10,000 feet, then a depressurization warning may be triggered. In step 304, warning system 220 determines a rate of depressurization inside the cabin. To do so, warning system 220 may monitor the pressure inside of the cabin over a time period, and determine the change in the pressure inside of the cabin over the time period. Warning system 220 may then provide an indication of the depressurization warning and the depressurization rate to descent control system 230.

In response to the depressurization warning, descent control system 230 selects a rate for the emergency descent of aircraft 100 based on the rate of depressurization inside the cabin (step 306). In this embodiment, descent control system 230 is able to select from multiple different descent rates based on the rate of depressurization inside the cabin to select a descent rate that is appropriate for the rate of depressurization. After selecting the rate for the emergency descent, descent control system 230 initiates the emergency descent at the selected rate in step 308. For example, descent control system 230 may interface with the flight crew and/or flight control system 250 to initiate the emergency descent at the selected rate. Descent control system 230 may additionally or alternatively provide input to autopilot system 240 to initiate the emergency descent at the selected rate.

Descent control system 230 may select the emergency descent rate (step 306) in a number of ways. FIG. 4 is a flow chart illustrating a method 400 of selecting a rate for an emergency descent in an exemplary embodiment. In step 402, descent control system 230 stores a plurality of emergency descent profiles for aircraft 100. Each emergency descent profile defines a (different) rate of descent for aircraft 100 in the event of a depressurization warning. Descent control system 230 then selects one of the emergency descent profiles in step 404 based on the rate of depressurization inside the cabin. By having multiple emergency descent profiles as in method 400, descent control system 230 can select the rate for the emergency descent in proportion to the rate of depressurization in the cabin.

The number of emergency descent profiles used for aircraft 100 may vary as desired. In one example, there may be two different emergency descent profiles defined in the emergency descent procedures for aircraft 100. One of the emergency descent profiles is for an aggressive rapid emergency descent which can be used when the rate of pressure loss in the cabin is high. The other emergency descent profile is for a less aggressive descent rate, which can be used when the rate of pressure loss in the cabin is slow. FIG. 5 is a flow chart illustrating a method 500 of selecting a rate for an emergency descent in an exemplary embodiment. In step 502, descent control system 230 stores a first emergency descent profile defining a rapid rate of descent for the aircraft. For example, the rate of descent in the first profile may be 6000 feet per minute. In step 504, descent control system 230 stores a second emergency descent profile defining an alternate rate of descent for the aircraft that is less than the rate defined in the first emergency descent profile. For example, the alternate rate of descent in the second profile may be 5000 feet per minute. In step 506, descent control system 230 determines if the rate of depressurization inside the cabin of aircraft 100 exceeds a threshold. The threshold may be set to any desired value to differentiate between a critical depressurization of the cabin, and a less significant depressurization of the cabin.

If the depressurization rate exceeds the threshold, then descent control system 230 selects the first emergency descent profile in step 508. In this scenario, the depressurization rate is considered to be critical, so descent control system 230 selects the first emergency descent profile that defines a rapid rate of descent. If the depressurization rate does not exceed the threshold, then descent control system 230 selects the second emergency descent profile in step 510. In this scenario, the depressurization rate is considered to be less significant, so descent control system 230 selects the second emergency descent profile that includes an alternate rate of descent that is slower than the rapid emergency descent rate.

Figure 6:
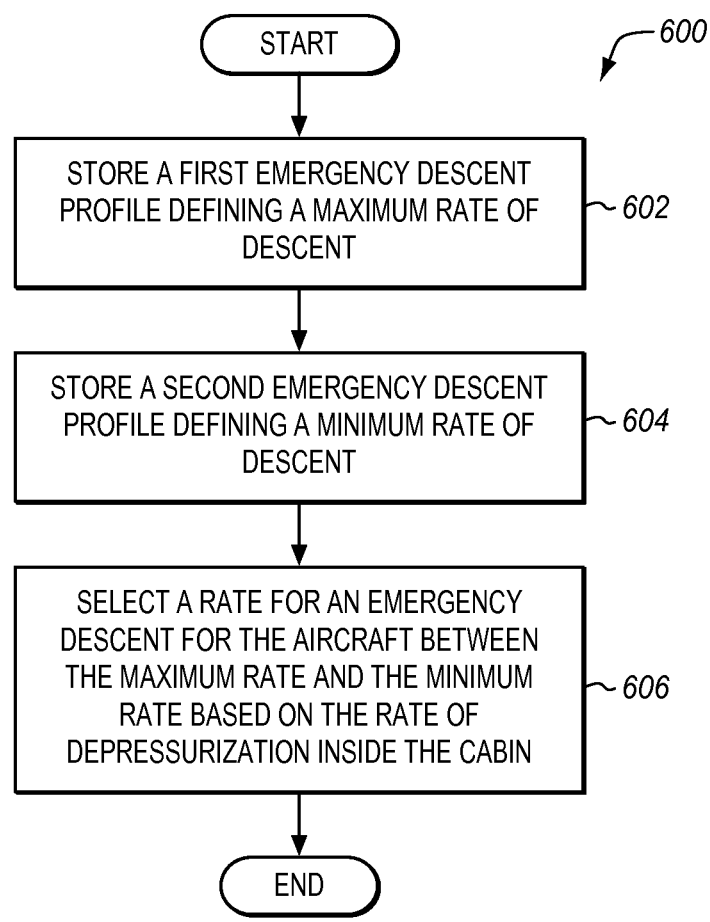
FIG. 6 is a flow chart illustrating a method of selecting a rate for an emergency descent in an exemplary embodiment.

In yet another embodiment, descent control system 230 may select the rate for the emergency descent as a sliding scale between a maximum descent rate and a minimum descent rate. FIG. 6 is a flow chart illustrating a method 600 of selecting a rate for an emergency descent in an exemplary embodiment. In step 602, descent control system 230 stores a first emergency descent profile defining a maximum rate of descent for aircraft 100. For example, the maximum rate of descent in the first profile may be 6000 feet per minute. In step 604, descent control system 230 stores a second emergency descent profile defining a minimum rate of descent for aircraft 100. For example, the minimum rate of descent in the second profile may be 1500 feet per minute, 3000 feet per minute, 4000 feet per minute, etc. In step 606, descent control system 230 selects a rate for the emergency descent between the maximum rate and the minimum rate based on the rate of depressurization inside the cabin of aircraft 100. Descent control system 230 is able to select the rate for the emergency descent on a sliding scale between a minimum and maximum depending on how fast the cabin is losing pressure. If the cabin is losing pressure rapidly, then descent control system 230 may select the maximum rate for the emergency descent. If the cabin is losing pressure very slowly, then descent control system 230 may select the minimum rate for the emergency descent. If the cabin is losing pressure at a medium rate, then descent control system 230 may select a rate for the emergency descent that is somewhere between the maximum and minimum. Thus, the rate for the emergency descent is selected as a function of cabin pressure loss.

Because emergency descent system 200 selects a rate for an emergency descent based on a depressurization rate of the cabin, rapid descents can be avoided upon a depressurization event unless it is necessary. In many cases, aircraft 100 can descend at a slower rate upon a depressurization event so that the occupants of the aircraft 100 do not have to experience a rapid aircraft maneuver.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. A method of initiating an emergency descent procedure in an aircraft, the method comprising:
   detecting, within a warning system of the aircraft, a depressurization warning for a cabin of the aircraft;
   determining, within the warning system, a rate of depressurization inside the cabin;
   selecting, within a descent control system of the aircraft, a rate for an emergency descent for the aircraft in response to the depressurization warning based on the rate of depressurization inside the cabin, wherein selecting the rate for the emergency descent comprises:
      storing a first emergency descent profile defining a maximum rate of descent for the aircraft;
      storing a second emergency descent profile defining a minimum rate of descent for the aircraft; and
      selecting the rate for the emergency descent between the maximum rate and the minimum rate based on the rate of depressurization inside the cabin, wherein the rate for the emergency descent increases from the minimum rate to the maximum rate as the rate of depressurization increases; and
   initiating the emergency descent at the selected rate by providing input regarding the selected rate from the descent control system to an autopilot system of the aircraft.

2. The method of claim 1 wherein determining a rate of depressurization inside the cabin comprises:
   monitoring a pressure inside the cabin over a time period; and
   determining a change in the pressure inside the cabin over the time period.

3. An apparatus comprising:
   an emergency descent system of an aircraft, the emergency descent system comprising:
      a warning system configured to detect a depressurization warning for a cabin of the aircraft, and to determine a rate of depressurization inside the cabin; and
      a descent control system configured to store a first emergency descent profile defining a maximum rate of descent for the aircraft, to store a second emergency descent profile defining a minimum rate of descent for the aircraft, and to select a rate for an emergency descent for the aircraft in response to the depressurization warning between the maximum rate and the minimum rate based on the rate of depressurization inside the cabin, wherein the rate for the emergency descent increases from the minimum rate to the maximum rate as the rate of depressurization increases;
      the descent control system is configured to initiate the emergency descent at the selected rate by providing input regarding the selected rate to an autopilot system of the aircraft.

4. The apparatus of claim 3 wherein:
   the emergency descent system further comprises at least one pressure sensor configured to measure a pressure inside of the cabin; and
   the warning system is configured to monitor the pressure inside the cabin over a time period based on the measurements from the at least one pressure sensor, and to determine a change in the pressure inside the cabin over the time period.

5. A non-transitory computer readable medium that stores program instructions for an emergency descent system for an aircraft, where the program instructions when executed by a computer system, instruct the computer system to:
- detect a depressurization warning for a cabin of the aircraft;
- determine a rate of depressurization inside the cabin;
- store a first emergency descent profile defining a maximum rate of descent for the aircraft;
- store a second emergency descent profile defining a minimum rate of descent for the aircraft;
- select a rate for an emergency descent for the aircraft in response to the depressurization warning between the maximum rate and the minimum rate based on the rate of depressurization inside the cabin, wherein the rate for the emergency descent increases from the minimum rate to the maximum rate as the rate of depressurization increases; and
- initiate the emergency descent at the selected rate by providing input regarding the selected rate to an autopilot system of the aircraft.

\* \* \* \* \*